United States Patent [19]
Noguchi et al.

[11] Patent Number: 5,812,981
[45] Date of Patent: Sep. 22, 1998

[54] METHOD OF CREATING A DATA ITEM OBJECT SUITABLE FOR AN APPLICATION FROM A STANDARD OBJECT ORIENTED PART

[75] Inventors: Atsuhiro Noguchi, Ichikawa; Osamu Ohno, Funabashi; Satoshi Awane, Ichikawa; Yosuke Morioka, Kawasaki, all of Japan

[73] Assignee: Hitachi, Ltd., Tokyo, Japan

[21] Appl. No.: 846,184

[22] Filed: Apr. 28, 1997

Related U.S. Application Data

[63] Continuation of Ser. No. 346,940, Nov. 23, 1994, abandoned.

[30] Foreign Application Priority Data

Nov. 26, 1993 [JP] Japan .................................... 5-296241

[51] Int. Cl.⁶ ........................... G06F 19/00; G06F 17/30
[52] U.S. Cl. ............................................... 705/1; 707/103
[58] Field of Search ............................ 705/1; 707/4, 103

[56] References Cited

U.S. PATENT DOCUMENTS

| | | | |
|---|---|---|---|
| 5,159,687 | 10/1992 | Richburg | 395/700 |
| 5,206,951 | 4/1993 | Khoyi et al. | 395/650 |
| 5,228,123 | 7/1993 | Heckel | 395/155 |
| 5,247,651 | 9/1993 | Clarisse | 395/500 |
| 5,280,609 | 1/1994 | MacPhail | 395/600 |
| 5,367,633 | 11/1994 | Matheny et al. | 395/164 |
| 5,369,778 | 11/1994 | San Soucie et al. | 395/800 |
| 5,446,885 | 8/1995 | Moore et al. | 707/103 |

*Primary Examiner*—Donald E. McElheny, Jr.
*Attorney, Agent, or Firm*—Antonelli, Terry, Stout & Kraus, LLP

[57] ABSTRACT

An object oriented system is configured to have the steps of creating an object oriented part composed of a data section and a procedure section for defining specification information about I/O and procedure information indicating the processed content at each data item of a business processing program for performing a process about a data item, storing the object oriented part in a library, selecting the object oriented part suited to a request from the business processing program from the library, creating an item object served as an execution module for the data item to be processed by the business processing program, and performing a data item process depending on the business processing program according to each item object.

4 Claims, 13 Drawing Sheets

| ITEM DATA |
|---|
| 1 |

| SEX DISTINCTION CODE | CONTENT |
|---|---|
| 1 | INDICATING "MALE" |
| 2 | INDICATING "FEMALE" |

FIG. 4

| ATTRIBUTE NAME (401) | ATTRIBUTE VALUE (402) | 406 |
|---|---|---|
| IN_FORM | ENGLISH | ← INPUT FORM USES ENGLISH |
| OUT_FORM | KANJI | ← OUTPUT EDITION USES KANJI |
| AP_FORM | NUMERIC | ← AP FORM USES NUMERICS |

206

403 — IN_FORM row
404 — OUT_FORM row
405 — AP_FORM row

FIG. 5

ATTRIBUTE DEFINITION TABLE 504

| ATTRIBUTE NAME | ATTRIBUTE VALUE | CONTENT OF DEFINITION | DATA REPRESENTING FORM | |
|---|---|---|---|---|
| | | | MALE | FEMALE |
| IN_FORM (403) | NUMERIC | INPUT FORM USES NUMERICS | 1 | 2 |
| | KANJI | INPUT FORM USES KANJI | 男 | 女 |
| | ENGLISH | INPUT FORM USES ENGLISH | M | F |
| | UI | INPUT FORM USES UI. | UI SELECTION | ↓ |
| OUT_FORM (404) | NUMERIC | OUTPUT EDITION USES NUMERICS | 1 | 2 |
| | KANJI | OUTPUT EDITION USES KANJI | 男 | 女 |
| | ENGLISH | OUTPUT EDITION USES ENGLISH | M | F |
| | SYMBOL | OUTPUT EDITION USES SYMBOLS | ♂ | ♀ |
| AP_FORM (405) | NUMERIC | AP FORM USES NUMERICS | 1 | 2 |
| | ENGLISH | AP FORM USES ENGLISH | MALE | FEMALE |

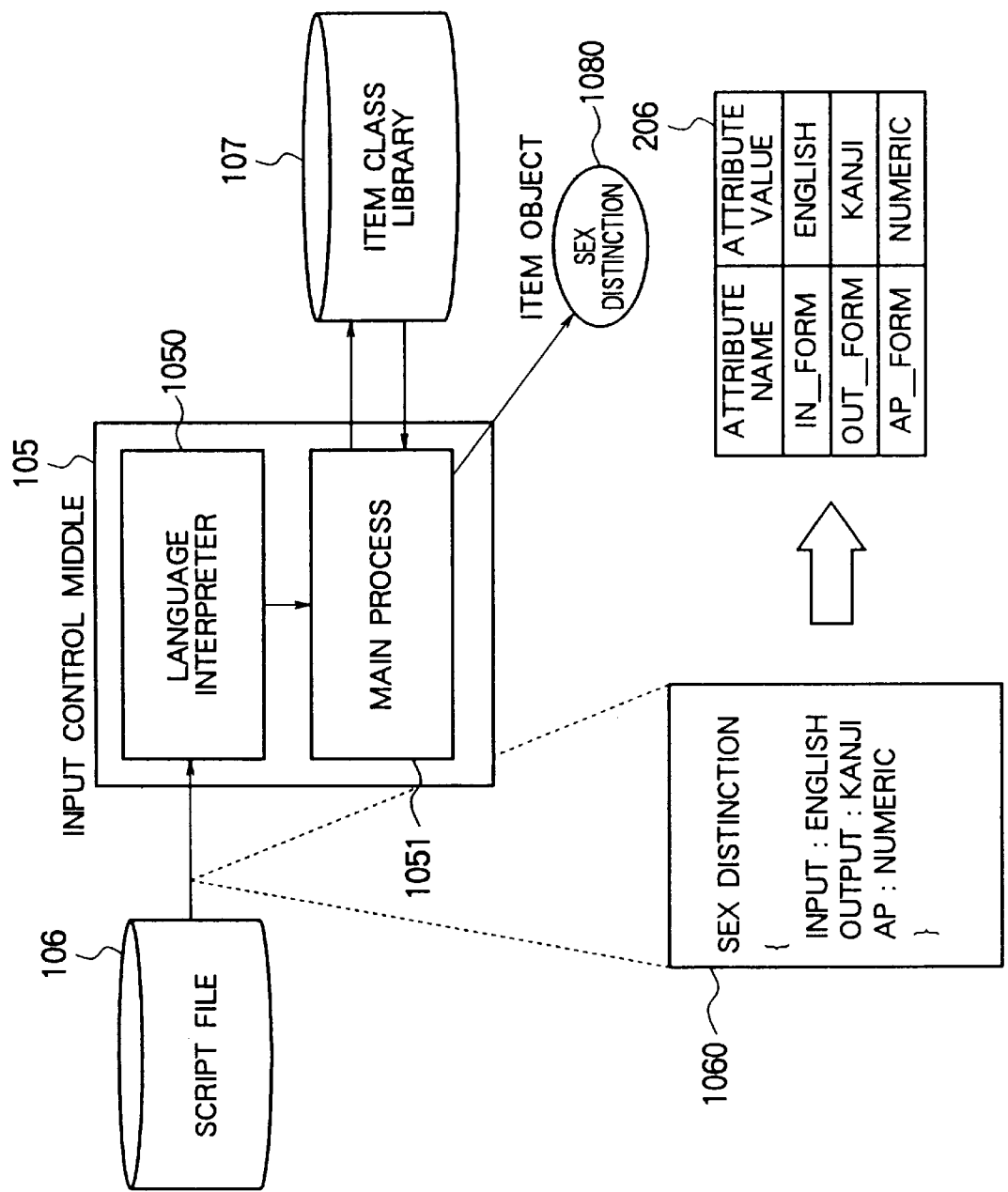

FIG. 14
(1) DEFINITION OF DATA ITEM PART
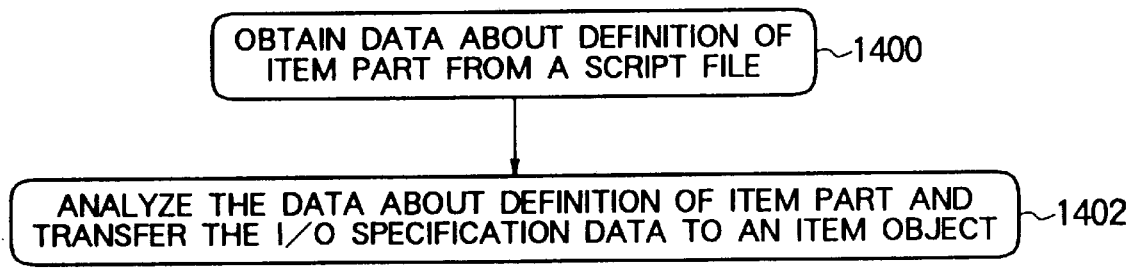
(2) CHECKING PROCESS FOR INPUT DATA
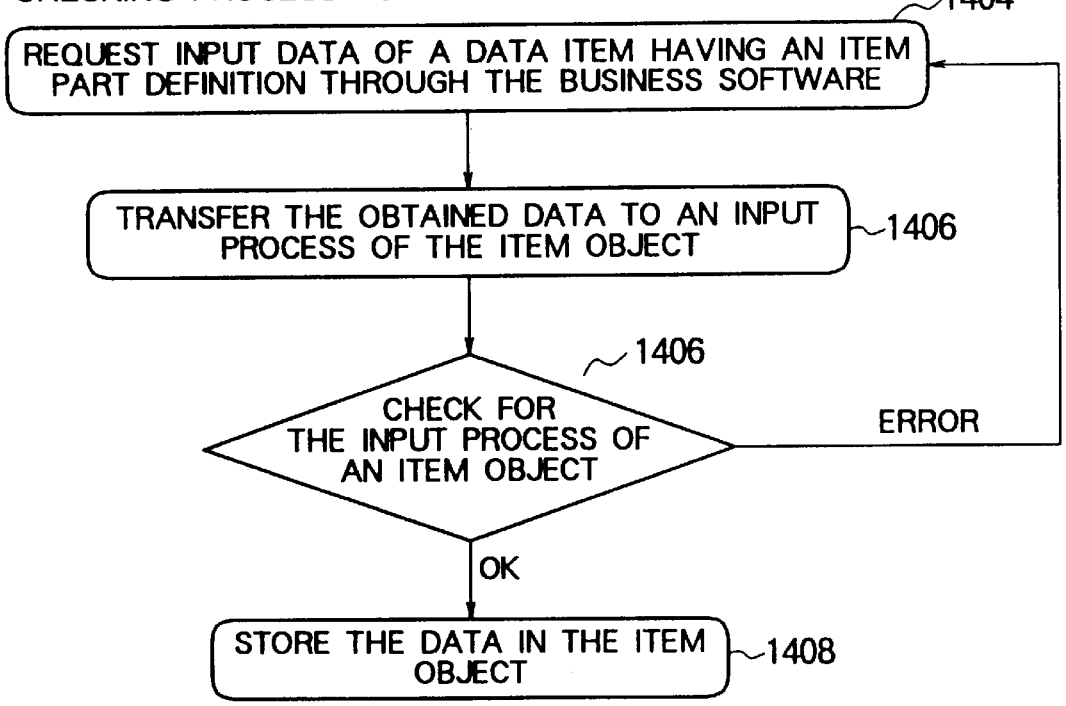
(3) OUTPUT EDITING PROCESS
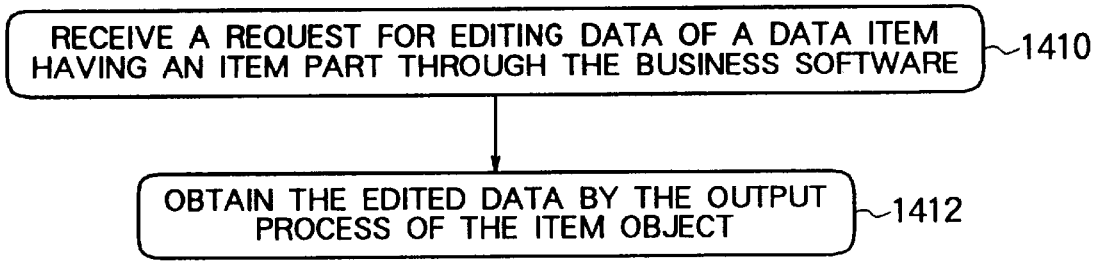

METHOD OF CREATING A DATA ITEM OBJECT SUITABLE FOR AN APPLICATION FROM A STANDARD OBJECT ORIENTED PART

This application is a continuation application of Ser. No. 08/346,940, filed Nov. 23, 1994, now abandoned.

BACKGROUND OF THE INVENTION

The present invention relates to a method for creating an object oriented system which is arranged to use an object for each data item for processing data items in a business application program configured to process data items.

As a method of facilitating the handling of an application program, a graphical user interface (referred to as GUI) has been employed in place of the conventional handling method which is arranged to input characters through a keyboard. The GUI mainly uses a pointing device, like a mouse, for handling an application program. As a method for developing an application for supporting the GUI, the use of a program product "UIBT (User Interface Building Tool)" has been heretofore proposed. This UIBT is a tool for creating a GUI capable of providing many kinds of functions using the X Window System and the "Hitachi Motif".

This tool, however, uses a method in which a part, like a list box or a dialogue box for arranging the GUI (referred to as a GUI part), is configured by designating certain source codes. Hence, a person having no skill in writing a program for describing a GUI, like the Hitachi Motif, may have difficulty in configuring this GUI part.

Under this circumstance, in order to allow even a novice to easily configure a GUI part, there has been provided a fundamental group of GUI parts, referred to as a UI object, and an editor for configuring a GUI part, referred to as a UIBT editor. The GUI part group and the UIBT editor allow even a novice to configure a GUI part which is suitable for an image created by a developer and to create a method for controlling the location of each GUI part. A group of functions, referred to as a UIBT library, for defining the motion of a screen image, has been provided as well.

These measures enable an application developer to configure a GUI part as he or she imagines and thereby to efficiently create a screen based on the GUI part.

The foregoing prior art, however, merely makes it possible for a developer to define a screen pattern and a screen transition of the GUI, but it is impossible with the conventional technology to check input data concerning data items to be treated inside of an application through the screen image (concretely, "date" or "name" to be defined in a database) or to edit the output data. That is, for checking the input data or editing the output data, a developer of the application program is required to describe the concrete data items using source codes. This disadvantage prevents easy creation of a system for carrying out processes concerning data items.

SUMMARY OF THE INVENTION

It is a first object of the present invention to provide a method of creating an object oriented system which is arranged to easily create a system for doing general processes concerning data items, in addition to a data item treated by each GUI part on a screen.

It is a second object of the present invention to provide a method of creating an object oriented system which is arranged to easily create a system for treating processes of many kinds of data items, such as recycling of a data item process.

It is a third object of the present invention to provide a method of creating an object oriented system which is excellent in maintenance.

It is a fourth object of the present invention to provide a method of creating an object oriented system which is excellent in productivity.

To achieve the first object, the method of creating an object oriented system for performing processes concerning data items depending on the business application program according to the present invention includes the steps of creating an object oriented part composed of a data section for defining specification data concerning inputs and outputs, the specification data having a data checking specification at an input time and a data editing specification at an output time described therein, and a procedure section for implementing each data checking specification and each data editing specification, the object oriented part for each data item of a business application program for doing processes concerning data items, storing the object oriented parts in a library, selecting an object oriented part from the library in response to a request given from the business application program, creating item objects as execution modules for the selected object oriented part, and configuring the system from the item objects.

To achieve the second object, the specification data concerning inputs and outputs to be defined in the data section is set in a script describing an I/O (input/output) specification concerning each data item to be processed by the business application program, the script being a simplified programming language represented as a 4GL (4th Generation Language).

To achieve the third object, an item control section is provided for transferring information between the item object and the business application program so that the item control section performs a process involving the business through the procedure defined by the item object for the data item in consideration of the data to be inputted from the business application program and transfers the processed result to the business application program.

To achieve the fourth object, the script is arranged by decoding the I/O specification defined for each part by a language interpreter in the item control section and by setting the decoded data into the data section of the object oriented part.

The item control section operates to create an object oriented part composed of the data section for defining the I/O specification data and the procedure section for defining the procedure data indicating the processed content, for each data item of the business application program. Then, the object oriented part for each data item is stored in the library. Then, if a request is issued from the business application program, the object oriented part is selected from the library according to the request so as to create item objects as execution modules for the data item to be processed by the business application program. Through this operation, the object oriented system is configured to perform the data item process depending on the business application program according to the procedure defined in the item object.

As mentioned object, if a developer knows the I/O specifications concerning the data items treated by the business application program, a system is easily developed by using the recycled object oriented parts without having to design a new procedure.

By adding a new procedure to the existing object oriented part, the method enables a new object oriented part to be easily created, thereby improving the productivity and expandability of system development.

As mentioned above, as the general features of the object oriented part, the method is arranged to inhibit the change of the item data to be processed from the outside and to handle the item data only through the procedure defined in each object oriented part. It is therefore possible to protect data from being destroyed by the direct handling of the data, thereby improving the safety of the data item process in the system.

On the other hand, by setting the specification data concerning an I/O defined in the data section of the object oriented part, based on the script described in the I/O specification concerning the data item to be processed by the business application program, when creating the item object, for example, if the I/O specification data for setting the input data as numerals and the output data as Kanji (Chinese characters) is set in the script, in the I/O procedure of the created item object, the numerals are checked when the data is inputted and the chines characters are edited when the data is outputted. Likewise, if the I/O specification data for setting the input data as numerals and the output data as English characters is set in the script, the numerals are checked when the data is inputted and the English characters are edited when the data is outputted.

Hence, a mere change in the content of the script allows a system for doing various data item processes to be easily developed or makes it possible to easily cope with a change in the business specification.

On the other hand, the item control section is provided for transferring information between the item object and the business application program. Through the effect of this item control section, the process based on the business is executed through the procedure defined in the item object for each of the data items against the data to be inputted from the business application program. The processed result is transferred to the business application program. Then, the item control section serves as all of the interfaces to the business application program and the handling from the outside so that the data item process is closed inside of the item object. This makes a great contribution to improving the maintainability of the data item process.

Further, by decoding the script using the language interpreter inside of the item control section and by setting the decoded result into the data section of the object oriented part, it is possible to develop a system for performing data item processes for various business specifications while keeping the system productivity high.

BRIEF DESCRIPTION OF THE DRAWINGS

FIGS. 3A and 3B are views showing a set example of the item code in the sex distinction code and a correspondence between a sex distinction code and its content:

FIG. 4 is a view showing definitions of an attribute definition table;

FIG. 5 is a graph showing a correspondence between an attribute value and an attribute name defined on an attribute definition table of the sex distinction code;

FIG. 9 is an explanatory view showing an internal operation of the item control middle;

FIG. 14 is a flowchart showing an operation of the item control middle.

DESCRIPTION OF THE PREFERRED EMBODIMENT

An embodiment of the invention will be discussed in detail with reference to the drawings.

Figure 1:
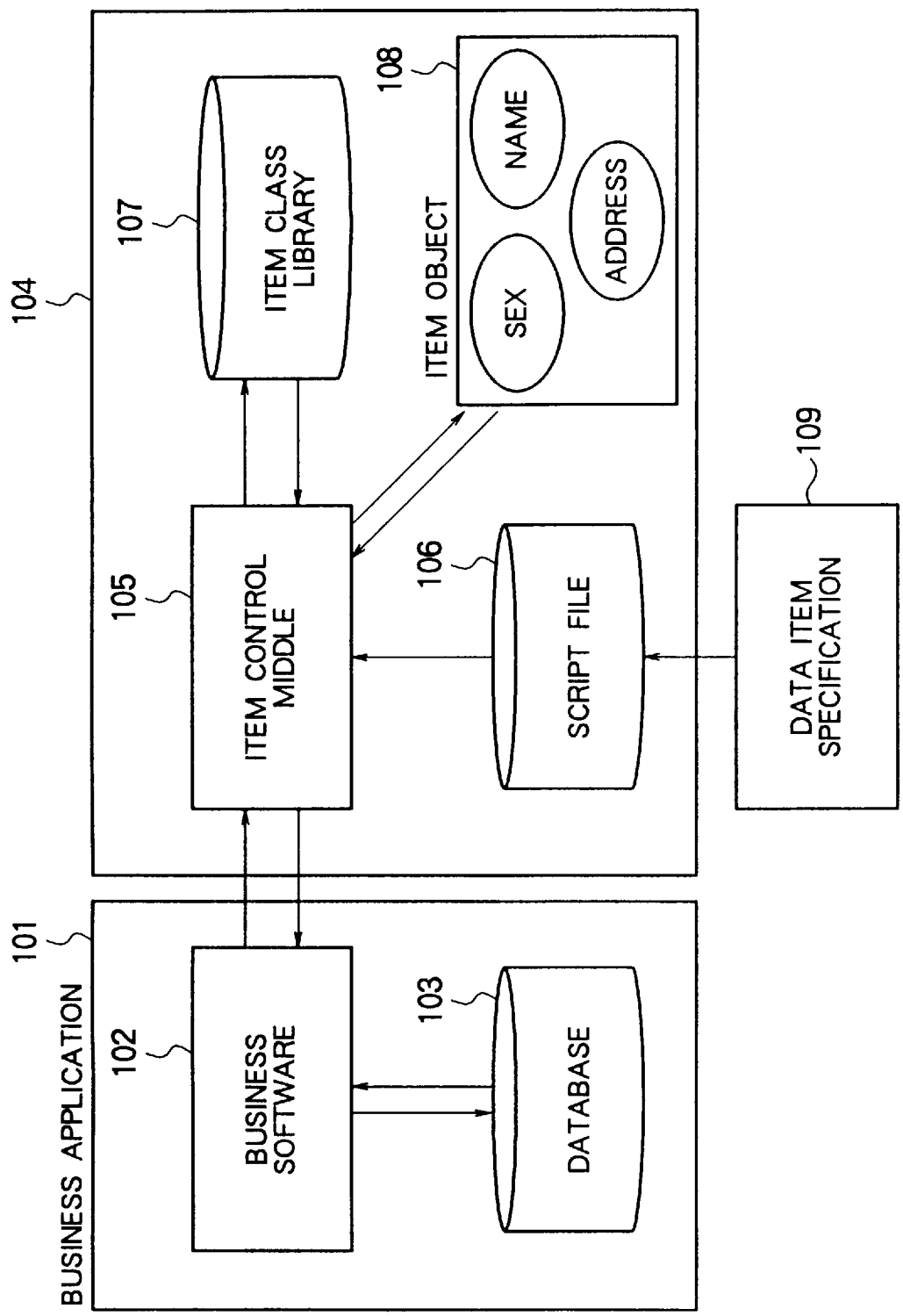
FIG. 1 is a block diagram showing a software arrangement according to an embodiment of the present invention.

FIG. 1 is a block diagram showing a software configuration according to one embodiment of the invention. In this embodiment, a business application 101 is configured of business software (a program for business processing) 102 and a database 103 and depends on the business to be processed. The conventional general business software is configured to perform all of the processes containing a data item process. In this embodiment, on the other hand, the business process for each data item containing an input check and data editing for each data item is executed by an item object 108 created from an object oriented part called as a class, which exists in an item class library 107 provided independently of the business application 101. The control of the item object 108 and data communication between the item object 108 and the business software 102 are executed by an item control middle 105.

To determine the content of the data item process executed by the item object 108, the following process is executed, which includes the steps of analyzing the content of a script file 106 for storing a data item specification 109, described by a simplified language and having a set I/O specification for each part, through the effect of the item control middle 105, and then of transferring the analyzed content to the item object 108.

In this embodiment, the item control middle 105 and an item class (item object oriented part) stored in the item class library 107, which are the subject parts of the system 104 according to the invention, will be discussed in detail below. The item control middle 105, which operates as an interviewing means between the business software 102 and the item object 108, controls the item object 108 created as an execution module according to the item class and manages the data item process based on the content of the script file 106.

Figure 2:
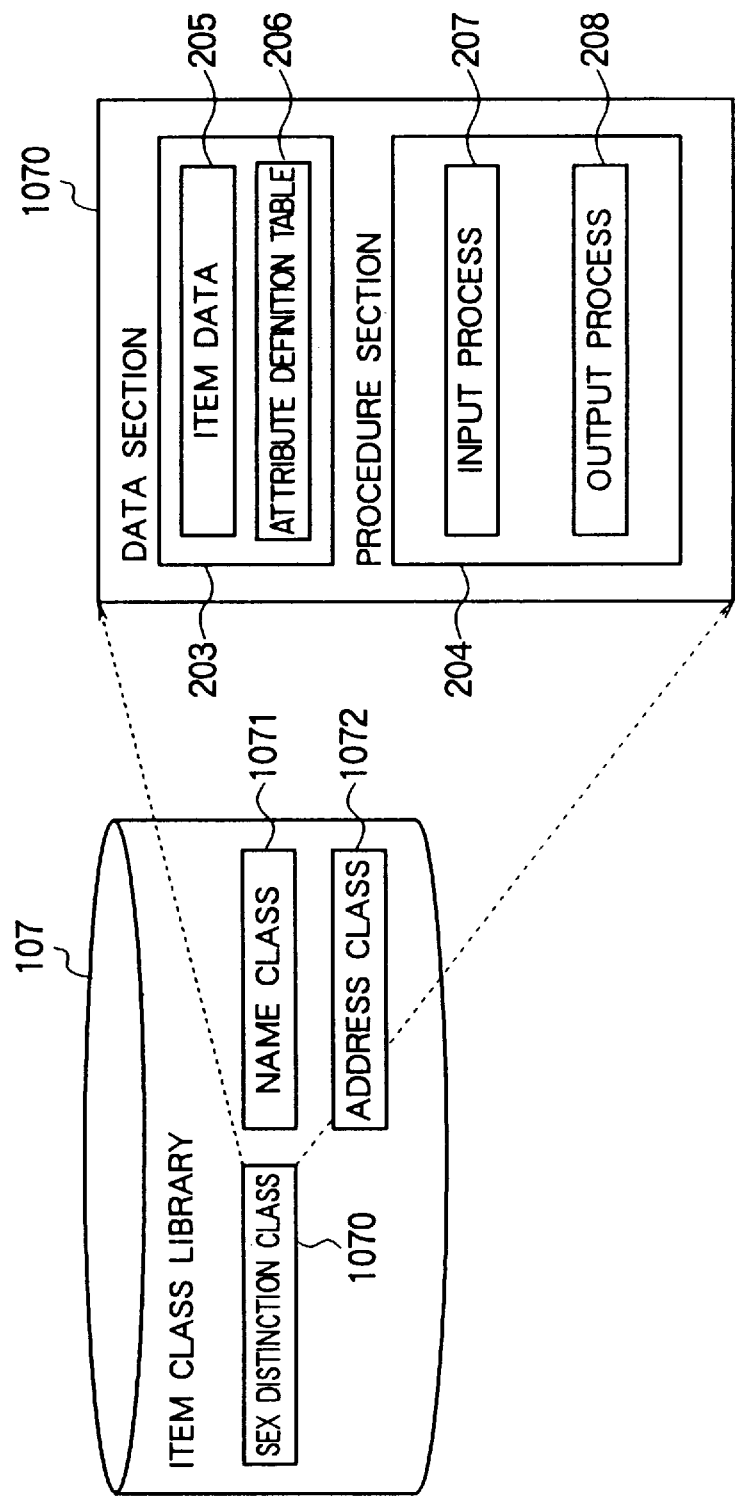
FIG. 2 is a diagram showing a content example of a item class library and an item class used in the software.

FIG. 2 shows representative arrangements of the item class library 107 and a sex distinction class 1070, selected from item classes concerning sex distinction, a name, an address and so forth. The item class library 107 stores a lot of item classes, such as the sex distinction class 1070, the name class 1071 and the address class 1072, which are independent of each data item.

In the sex distinction class 1070, the I/O specification of the item is defined in the data section 203. The format of a process for accessing the data in the data section 203 and performing a data item process is defined in the procedure section 204.

The data stored in the data section 203 includes item data 205 and an attribute definition table 206. The item data 205 represents data to be processed as a data item of each class. Hence, two or more kinds of item data 205 may be necessary if a certain kind of data item is treated by the class.

FIGS. 3A and 3B show an example of the item data 205 treated in the sex distinction class 1070. Herein, as the item data 205, there is set a sex distinction code "1". It represents the information "male" as indicated in a sex distinction code table 302.

The attribute definition table 206 includes that data which indicates the processing format of the procedure section 204 included in each class. It is provided as a data structure, as shown in FIG. 4. The attribute definition table 206 includes a pair of information, that is, an attribute name 401 and an attribute value 402. As the attribute name, an input form (IN FORM) 403, an output form (OUT FORM) 404 and an AP form (AP FORM) 405 are fundamentally provided. The AP form is a data form to be treated inside of the business application 101.

In the definition shown in FIG. 4, the input form 403 is defined as an English character input (ENGLISH), and the output form 404 is defined as a Kanji (Chinese) character output (KANJI). The AP form 405 is defined as a numeric representation (NUMERIC). The attribute value 402 for each attribute name 401 depends on the data item for each class.

FIG. 5 shows a variation of the attribute value 402 for the attribute name 401 in the case of the sex distinction class 1070. Herein, the input form 403 may be selected from four patterns, including numerics, Kanji, English characters, and a UI (User Interface). The output form 404 may be selected from four patterns, including numerics, Kanji, English characters and a UI, and the AP form 405 may be selected from two patterns, including numerics and English characters. The data representing form 504 of the sex distinction data corresponding to the attribute value 402 is set for each of those patterns.

The defined attribute names IN_Form, OUT_FORM and AP_FORM are all common to each class. According to the characteristic of the data item, each class is permitted to have its own individual attribute name. This individual attribute name may be designed.

By setting the attribute definition table 206, as described above, when the object is started, the input process 207 and the output process 208 stored in the procedure section 204, which are defined in each class, operate on the content of the attribute definition table 206.

Next, the description will be directed to the input process 207 and the output process 208 defined in the procedure section 204.

The input process 207 is executed for setting into the data section 203 the external input data as the item data. When the input data is set as the item data 205, a checking process is executed concerning the form defined in the attribute definition table 206.

Further, the output process 208 is executed for editing the item data 205 stored in the data section 203 based on the form defined in the attribute definition table 206 and for outputting the edited result to the outside.

Figure 6:
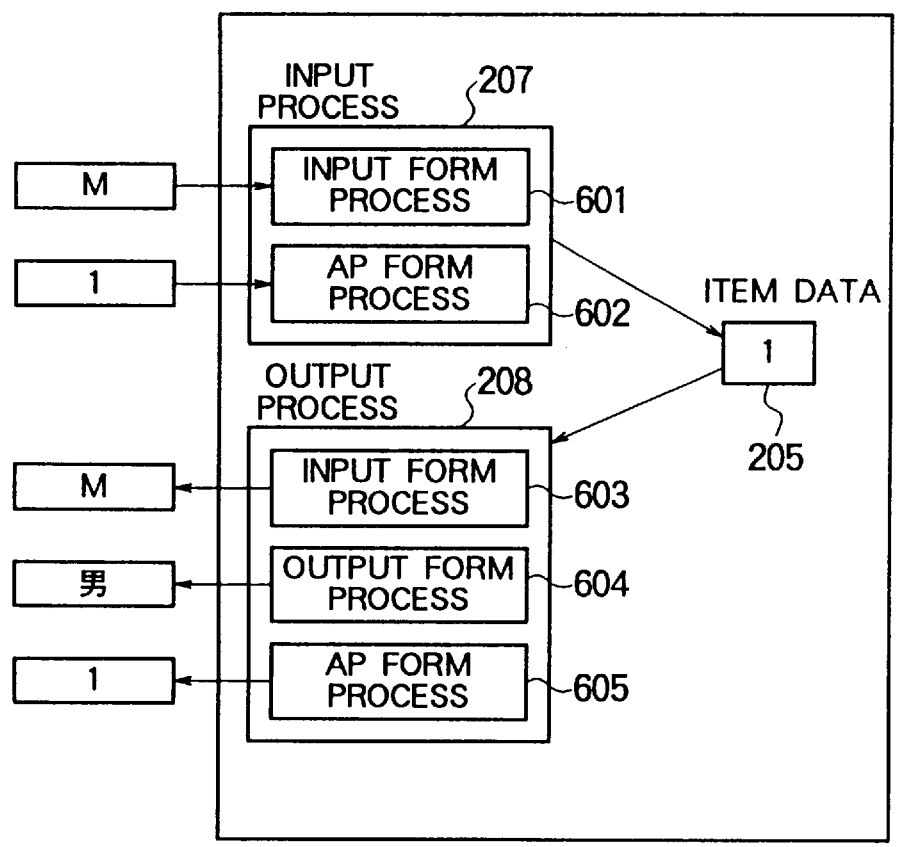
FIG. 6 is a flowchart showing a data flow appearing when executing the procedure of the procedure section in the sex distinction class.

FIG. 6 shows the data handling for the item object of the sex distinction class 1070 in the procedure section 204 and a concrete example of the result. For the sex distinction item object as well as any other item object, the process to be carried out at first is a process of setting the attribute definition table 206 in which a method for processing a data item is defined. With reference to FIG. 9, the processing method will be described later together with the operation of the item control middle 105. Herein, as shown in FIG. 4, the description concerns the I/O processing content of the item object of the sex distinction class in case of setting the attribute definition table 206.

At first, this embodiment treats three kinds of data forms. That is, at first, a data form to be inputted from a general input unit, second, a data form to be outputted to a general output unit, and third, a data form which is proper for the business software 102 or is to be treated inside of the database 103.

In the attribute definition table 206, the data forms are defined as an input form, an output form, and an AP form, so as to characterize the data according to each data form. Herein, the input process 207 is divided into two processes, that is, an input form process 601 and an AP form process 602. In each process, it is determined whether or not the input data has a data form defined in the attribute definition table 206. In the example of FIG. 6, as the item data 205, the sex distinction code "1" representing "male" is set.

The output process 208 is divided into three processes, that is, an input form process 603, an output form process 604, and an AP form process 605. Each process is executed to edit the item data 205 in the data form defined in the attribute definition table 206 and output the edited data.

Herein, two I/O processes are provided.

Figure 7:
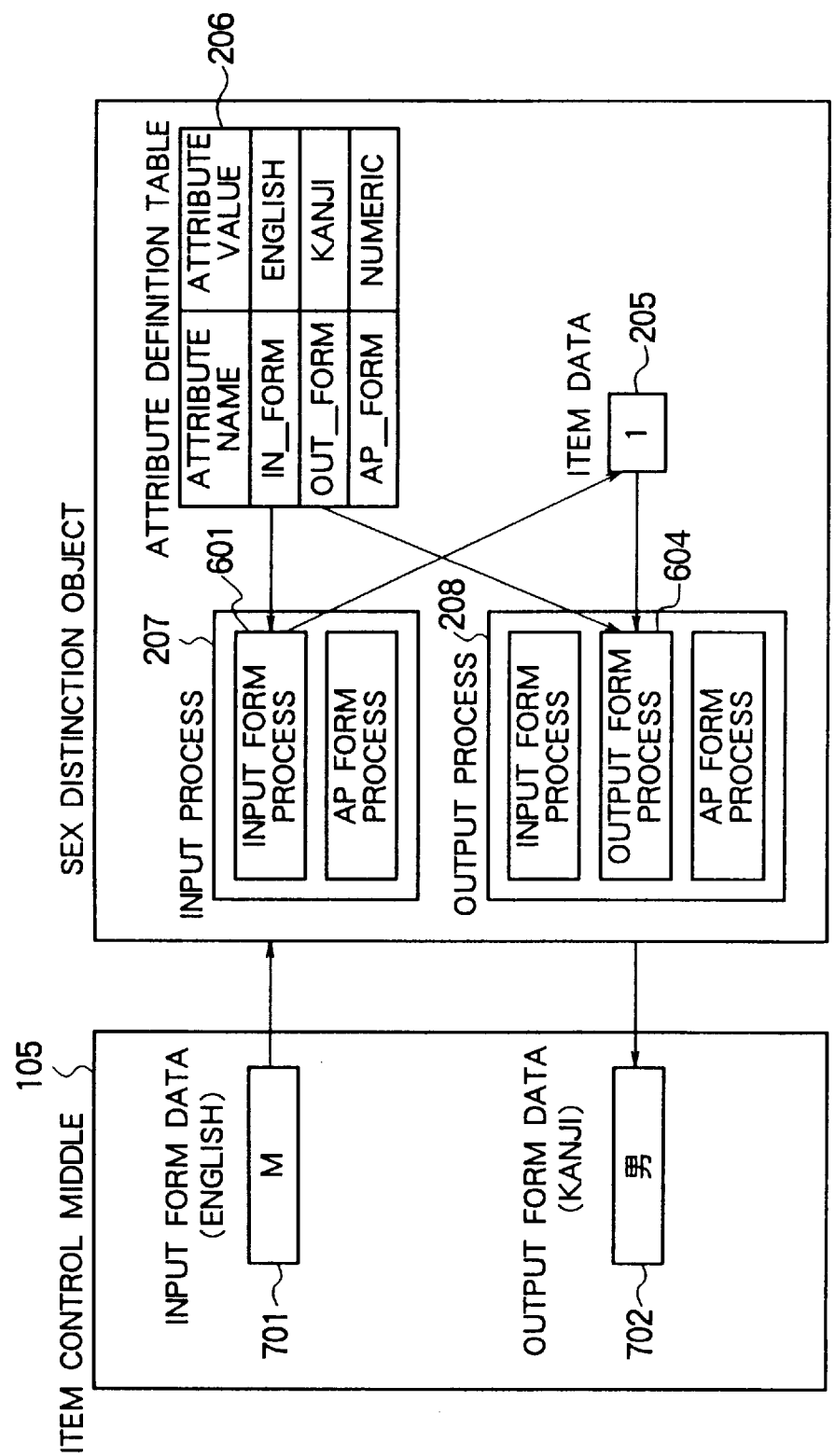
FIG. 7 is an explanatory view showing how a data item process is done by handling the sex distinction object through an item control middle.

FIG. 7 an example in which input form data 701 is supplied to a sex distinction object in the case of using the attribute definition table 206 shown in FIG. 4 and in which output form data 702 is obtained from the sex distinction object. In this embodiment, if the data "M" 701 is received in the input process, the item control middle 105 selects the input form process 601 from which data is inputted as item data 205.

In the execution of the input form process 601, reference is made to the attribute definition table 206 to make sure that the input form (IN_FORM) is English, to check to see if the input data 701 is an English character "M" or "F", if it is "M" or "F", to convert the input data 701 into a sex distinction code, and to store the code as item data 205. In the output process 208, by selecting the output form process 604, the output form is previously defined as Kanji in the attribute definition table 206. Hence, the data "男" 702 formed by editing the item data 205 in Kanji is passed to the item control middle 105.

Figures 8A, 8B:
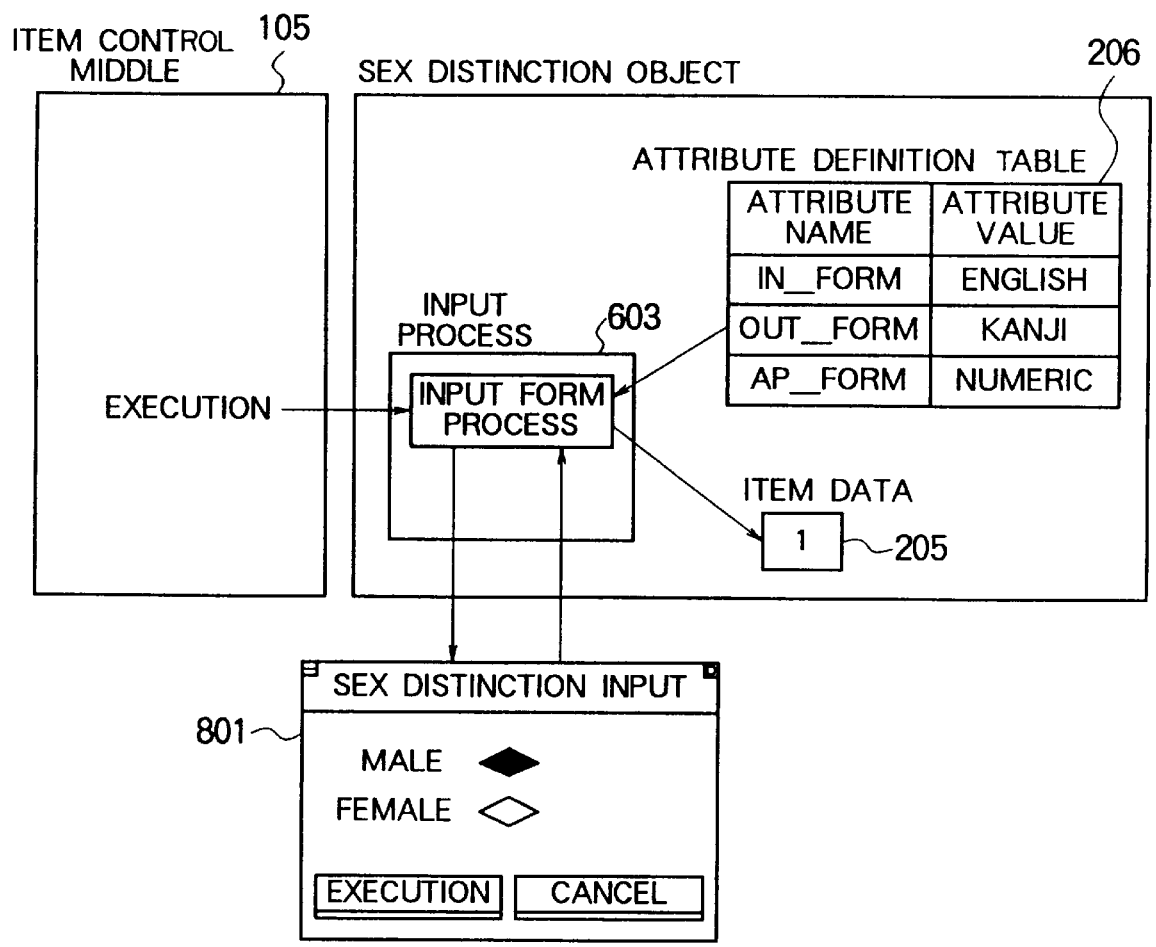
FIGS. 8A and 8B are explanatory views showing how a data item process is done by handling the sex distinction object through the item control middle when using an interactive UI.

FIGS. 8A and 8B show an input procedure for an item class provided in an interactive UI (User Interface) manner. In the attribute definition table 206, the input form 403 is changed to "UI".

When an interactive input is executed through an input dialogue box 801 in a GUI (Graphical User Interface), the item data is allowed to be selected and set through the input dialogue box regardless of the data form it may have. The timing when the selected input dialogue box 801 is outputted is managed by the item control middle 105 according to the operating state of the business software 102.

The description of the embodiment uses the sex distinction class 1070 as an example. The sex distinction code according to the selected sex distinction is set as the item data 205 of the sex distinction object. This setting operation will be discussed in detail below.

At first, in the case of performing the input process in the input form (IN_FORM), if the item control middle 105 issues an execution instruction to the input form process 603, the sex distinction input dialogue box 801 is outputted in the form of a GUI, because the input form is defined as "UI" in the attribute definition table 206. On this dialogue box, the designation "male" is selected by a radio button corresponding to one of the selectors in the GUI and then an execution button is pressed. In the input form process 603, a value of "1" corresponding to the sex distinction code "male" is set as the item data 205. In addition, the data output is analogous to that shown in FIG. 7.

Next, the description will be directed to the internal operation of the item control middle 105 in the case of treating a sex distinction item object with reference to FIG. 9.

The item control middle 105 operates to read script 1060 out of a script file 106 through a language interpreter 1050 included therein. The script 1060 includes a sex distinction attribute therein. Then, the middle 105 operates to analyze the content of the script 106, create the attribute definition table 206 concerning the sex distinction item, and passes the table 206 to a main process 1051. Then, the main process 1051 is executed to select a sex distinction class 1070 from the item class library 107 and generate a sex distinction object 1080 from the selected class 1070. At this time, the attribute definition table 206 is passed to the sex distinction object 1080. As such, the processing specification of the sex distinction object 1080 is determined when the object 1080 is generated.

Next, the operation of the item control middle 105 on the data item part will be discussed with reference to FIG. 14.

The data concerning the definition of a data item part is obtained from the script file 106 (step 1400).

Then, the data concerning the definition of the data item part is analyzed to obtain I/O specification data. The I/O specification data is transferred to the item object 108 (step 1402).

Next, the operation transfers to the input data check process.

The business software operates to request data concerning the definition of a data item part to be inputted to the data item (step 1404). The obtained data is transferred to the input process included in the item object 108 (step 1406). The input process of the item object 108 is checked (step 1406). If an error takes place, the operation returns to the step 1404. If no error takes place, the input data is stored in the item object 108 (step 1408).

Further, the editing process is executed when the data is outputted.

The item control middle 105 receives a request for edited data concerning the definition of the item part in the data item (step 1410) from the business software. Then, the item control middle 105 obtains the edited data from the output process included in the item object 108.

Next, the description will be directed to a series of operations containing the business software 101 and a flow of data in these operations if the data is directly inputted or if the data is inputted through the UI.

Figure 10:
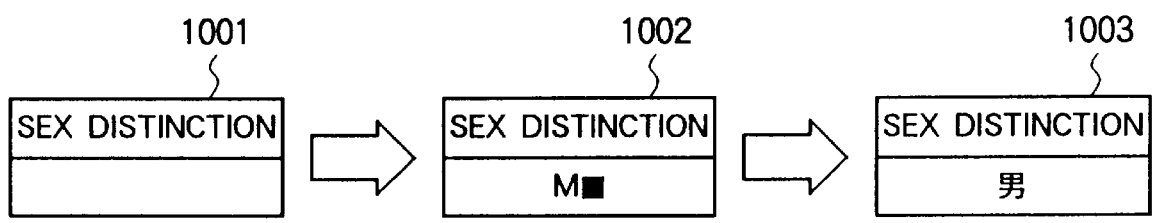
FIG. 10 is an explanatory view showing how a display is transited by the normal data input when the business application treats the sex distinction item.

At first, as shown in FIG. 10, the described process covers operations from the direct input of data to the display of the result, if the business application 101 treats a sex distinction item.

It is assumed that the script file 106 stores the script 1060 shown in FIG. 9. On the display, the business software 102 operates to display a sex distinction item 1001 in which no data is inputted.

To input a piece of data in the sex distinction item 1001, a pointing device, such as a mouse, may be used. The input form is defined as English by the script 1060. On the attribute definition table 206, the English data form of a sex is set so that a male is "M" and a female is "F" as shown in FIG. 5.

The letter "M" is inputted as the sex distinction data 1002 by the input device and then the execution key is pressed. Since the output form is defined as Kanji by the script 1060, "男" appears as the display data 1003 on the display unit.

Figure 11:
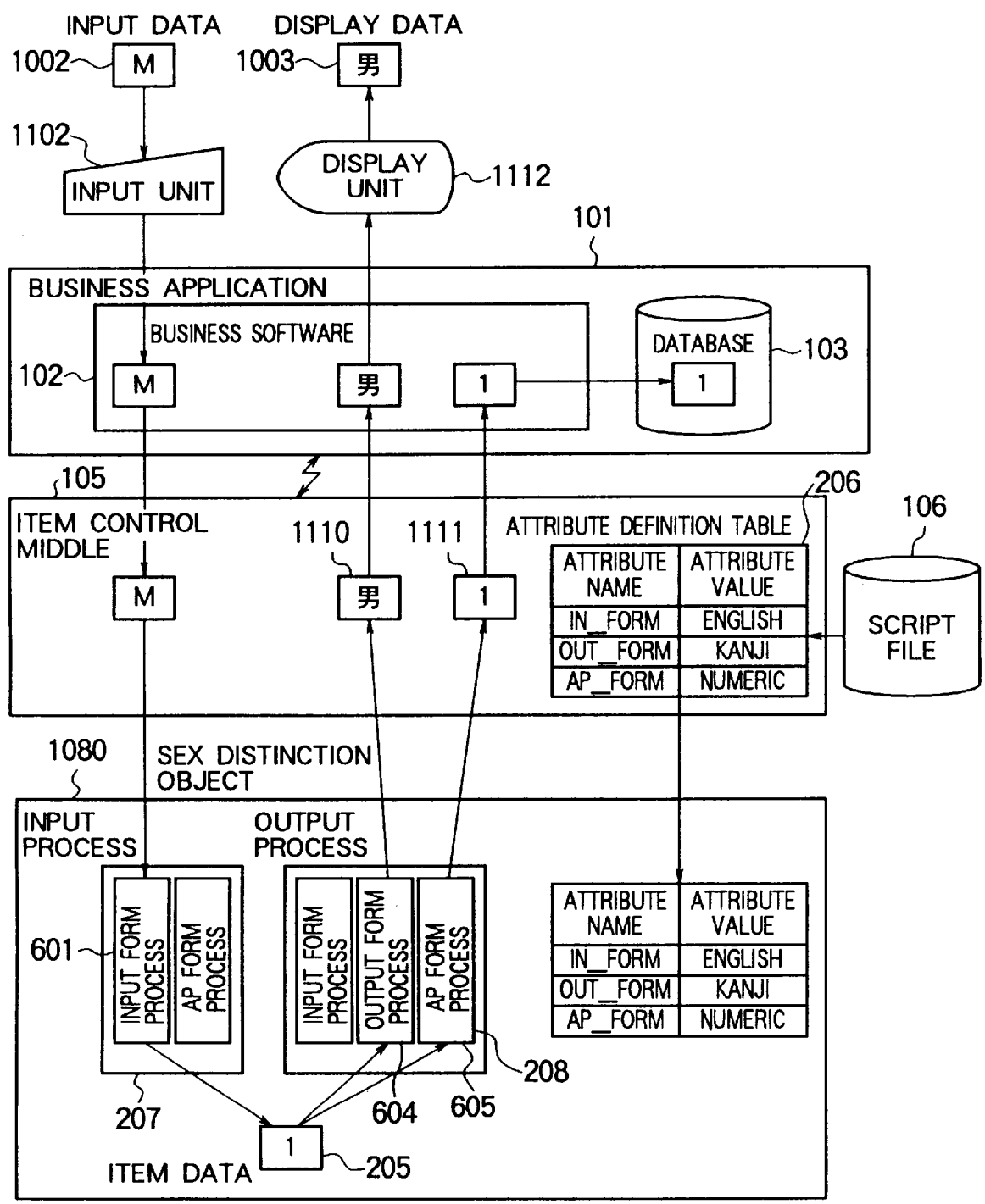
FIG. 11 is a flowchart showing a data flow in the transition shown in FIG. 10.
Figure 12:
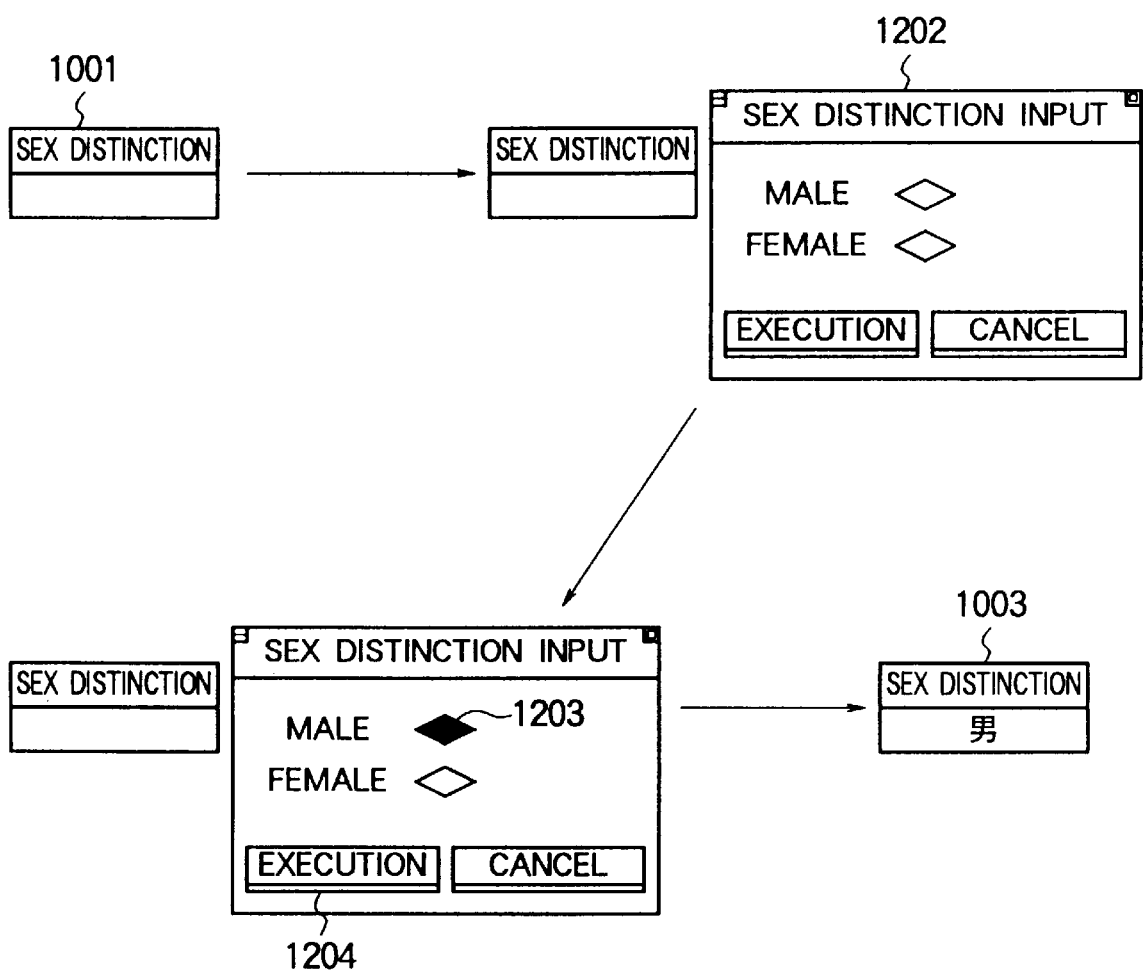
FIG. 12 is an explanatory view showing a transition of a display appearing when the UI input is given if the business application treats the sex distinction item.

The flow of data in the above process of transiting the displayed image will be described with reference to FIG. 11.

At the initial start time, the item control middle 105 operates to analyze the script 1060 stored in the scrip file 106 for creating the attribute definition table 206. When the sex distinction object is generated, the table 206 is set therein.

In this state, the sex distinction data "M" representing "male" as inputted through the input device 1102 is passed to the item control middle 105 through the business software 102. The item control middle 105 operates to select the input form process 601 in the input process 207 located in the sex distinction object 1080 and to input it. By this operation, the sex distinction code "1" representing "male" is set as the item data 205 of the object 1080.

Then, the item data 205 is managed by the business software 102 until the processed result appears on the display unit 1112. The business software 102 operates to cause the item control middle 105 to output the item data, if necessary. In this example, the item control middle 105 operates to obtain the data 1110 of "男" in the output form from the output form process 604 included in the output process 208 of the sex distinction object 1080 for the purpose of displaying the data 1110. After receiving the data 1110, the business software 102 operates to display the display data 1003 indicating the character "男" on the display unit 1112.

Further, at the time of displaying the data, the business application 101 is required to store the information of the input data 1002 in the database 103. In this case, the definition of the AP form to be treated inside of the business application 101 is represented as "NUMERIC" by the attribute definition table 206. Then, the item control middle 105 operates to obtain the AP form data 1111 of "1" from the AP form process 605 included in the output process 208 of the sex distinction object 1080 and passes the data 1111 to the business software 102. The AP form data 1111 is stored in the database 103 under the control of the business software 102.

Next, the description will be directed to the process covering the data input carried out through the UI to produce a displayed result concerning the sex distinction item. The script 1060 used for this purpose is equivalent to the script 1060 of the foregoing example, except that the input form is changed to "UI". Hence, the attribute definition table 206 created from this script 1060 is the same as that shown in FIG. 8B.

At first, on the screen, the sex distinction item 1001 appears in which no data is inputted by the business software 102. To input the data to this sex distinction item 1001, a pointing device, such as a mouse, is used. Since the input form is defined as "UI" by the script 1060, the sex distinction input dialogue 1202 is displayed.

With the mouse, a radio button 1203 indicating "male" is specified and an execution button 1204 is clicked. The display data 1003 indicating the character "男" is displayed on the display unit, because the output form is defined as "Kanji" by the script 1060.

Figure 13:
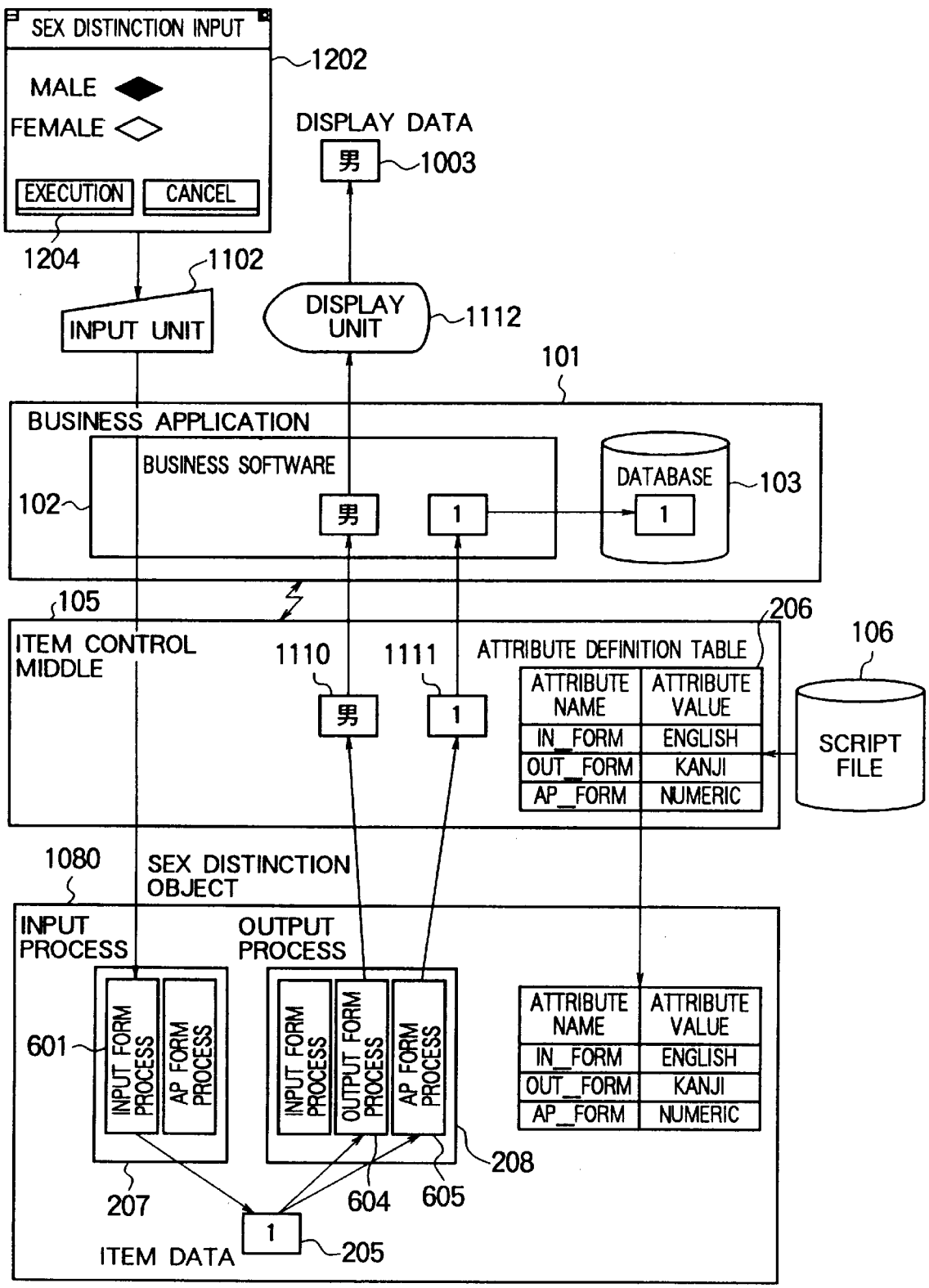
FIG. 13 is a flowchart showing a data flow appearing in the transition shown in FIG. 12.

The flow of data in the process of transiting the displayed image will be discussed with reference to FIG. 13.

Like the above example, the item control middle 105 operates to analyze the script 1060 stored in the script file 106 for creating the attribute definition table 206. The table 206 is set when the sex distinction object 1080 is created. Further, if the sex distinction item 1001 is specified with the mouse, the input form process 601 located in the input process 207 of the sex distinction object 1080 is invoked by the item control middle 105 under the control of the business software 102. By this operation, the input form defined in the attribute definition table 206 is determined to be "UI", so that the input dialogue 1202 is displayed on the screen.

If "male" is specified on the input dialogue 1202, the sex distinction code "1" representing "male" is set to the item data 205 included in the sex distinction object 1080 through the input unit 1102.

After that, the business software 102 manages it, and issues an output request to the item control middle according to the situation.

In this example, the operation is executed to select the designation "male" on the input dialogue 1202, to set the item data 205 at a time of handling the execution button 1204, obtain the output form data 1110 representing "male" from the output form process 604 of the output process 208 included in the sex distinction object 1080 for the purpose of displaying the data, and then to pass the output form data 1110 to the business software 102. The business software 102 operates to display the character "男" as the display data 1003 on the display unit 1112.

At time of displaying the data, the business application 101 is required to store the sex distinction data given on the input dialogue 1202 in the database 103. In this case, the definition of the AP form to be treated inside of the business application 101 is represented as "NUMERIC" by the attribute definition table 206. Then, the item control middle 105 operates to obtain the AP form data 1111 of a value "1" from the AP form process 605 of the output process 208 included in the sex distinction object 1080 and then pass the data 1111 to the business software 102. The business software 102 serves to store the data 1111 in the database 103.

As described above, the method of creating an object oriented system according to the present invention is performed to create an object oriented part composed of a data section for defining an I/O specification and a procedure section for defining a procedure indicating the processed content at each data item of a business processing program for performing a process concerning the data item, to store the object oriented part in a library, to select the object oriented part requested by the business processing program from the library, and to create item objects as execution modules for the data items to be processed by the business processing program. Hence, if the I/O specification data of the data item is obtained, a new procedure concerning a data item to be treated by the business processing program does not need to be designed. The existing object oriented parts are recycled in developing the system. This makes the development of the system easier.

By adding a new procedure to the existing object oriented part, it is possible to easily create a new object oriented part. This serves to enhance the productivity and the expandability of the system development.

Further, the object oriented system is capable of overcoming such a complex operation as selecting an I/O procedure from a variety of processes based on data forms, for example, the processes dependent on a numeric input and a Kanji output, thereby making the data item process more operative. If the interactive process uses a GUI for inputting data, the operativity of the data input is improved, if the data item relates a suitable business specification to the GUI.

Further, as mentioned above, as the general features of the object oriented part, the method is arranged to inhibit a change of the item data to be processed from the outside and to handle the item data only through the procedure defined in each object oriented part. It is therefore possible to protect data from being destroyed by the direct handling of the data, thereby improving the safety of the data item process in the system.

On the other hand, by setting the specification data concerning an I/O defined in the data section of the object oriented part based on script concerning an I/O specification about the data item to be processed by the business application program when creating the item object, for example, if the I/O specification data for setting the input data as numerals and the output data as Kanji is set in the script, in the I/O procedure of the created item object, the inputted data is checked to see if it is a numeral and the outputted data is checked if it is a Kanji character. To easily develop a system which makes it possible to perform various kinds of data item processes, it is necessary to change the described content of the script. Further, the system may easily cope with a change in a business specification.

On the other hand, the item control section is provided for transferring information between the item object and the business application program. Through the effect of this item control section, the process based on the business is executed through the procedure defined in the item object for each of the data items with respect to the data to be inputted from the business application program. The processed result is transferred to the business application program. Then, the item control section serves as all of the interfaces to the business application program and the handling from the outside so that the data item process is closed inside of the item object. This makes a great contribution to improving the maintainability of the data item process.

Further, by decoding the script using a language interpreter inside of the item control section and by setting the decoded result into the data section of the object oriented part, it is possible to develop a system for performing data item processes for various business specifications while keeping the system productivity higher.

What is claimed is:

1. A computer program stored in a storage medium for creating a data item object for use by a business processing program being executed by a computer based on object oriented parts contained in an item class library, and for processing the created data item object, each of said object oriented parts being composed of a data section and a procedure section, said data section defining a variety of input/output data attributes along with their data representing forms for a data item and said procedure section defining an input process performed on the data item for any defined input data attribute input into the business processing program and an output process performed on the data item for any defined output data attribute output from the business processing apparatus, said computer program when executed by said computer causes said computer to perform the steps of:

(a) selecting from said item class library an object oriented part in response to a request for said object oriented part from said business processing program;

(b) creating a data item object from the selected object oriented part by setting data attributes in a form of a data attribute definition table in said data section of said object oriented part, said data attribute definition table being composed of at least one pair of data attribute and data processing attribute; and (c) executing an input processing of the data item object in response to data input into the business processing program and executing output processing of the data item object for data output from the business processing program based on content of said data attribute definition table in the data item object.

2. A computer program according to claim 1, wherein said step (b) sets data attributes of the data item object based on a script setting forth an input/output specification of the data item.

3. A computer program stored in a storage medium for preforming business processing by using a computer business processing program including at least a data input operation processing, said computer program when executed by said computer causes said computer to perform the steps of:

(a) creating a data attribute definition table for each data item processed in the business processing program, said data attribute definition table being composed of at least one pair of a data attribute and a data processing attribute of a data item;

(b) selecting said data attribute definition table corresponding to a data item appearing during execution of the business processing program; and (c) performing processing relating to the data item in accordance with content of the selected data attribute definition table.

4. A computer program according to claim 3, wherein said data processing attribute represents at least one of input, output, and store processes of a data item in the business processing program.

* * * * *